United States Patent Office 3,804,922
Patented Apr. 16, 1974

3,804,922
RUBBERY POLYMERS
Lewis J. Fetters, Akron, Ohio, Rudolf F. Kammereck, State College, Pa., and Maurice Morton, Akron, Ohio, assignors to The University of Akron, Akron, Ohio
No Drawing. Continuation-in-part of abandoned application Ser. No. 108,957, Jan. 22, 1971. This application Dec. 29, 1972, Ser. No. 319,446
Int. Cl. C08f 33/08
U.S. Cl. 260—874
9 Claims

ABSTRACT OF THE DISCLOSURE

Disclosed is a method for the preparation of new and useful triblock copolymers of the ABA type, wherein the B block is a polysulfide and the A block is a polymerizable vinyl-substituted compound. Formation of the B block is accomplished by initiating cyclic sulfides with organolithium compounds at conditions of low temperature, subatmospheric pressure free from active hydrogens and compounds such as water and in a polar solvent. Depending upon the initiator selected, the resulting polysulfide will terminate with either or both ends possessing a carbanion which is capable of initiating polymerization of subsequently added vinyl-substituted compounds to form the A block. Thus either an AB copolymer or an ABA triblock copolymer may be formed.

CROSS REFERENCE TO RELATED APPLICATION

This application is a continuation-in-part application of U.S. Ser. No. 108,957, filed Jan. 22, 1971, now abandoned.

BACKGROUND OF THE INVENTION

The present invention relates to a new method for the preparation of polymers of cyclic sulfides terminated by a carbanion at either or both ends. The polysulfide so prepared is capable of initiating polymerization of vinyl-substituted monomers to form either block copolymers of the AB type or triblock copolymers of the ABA type.

The polymerization of cyclic sulfides and vinyl-substituted monomers initiated by organolithium compounds is well known in the art. Thiiranes, cyclic sulfides having three membered rings, form a lithium alkylthiolate which is capable of reacting with excess amounts of the thiirane to form a linear polymer, having a C—C—S backbone terminated by lithium. Such a structure is not capable of initiating vinyl-substituted monomers and therefore to form block copolymers it is necessary to first form the vinyl-substituted polymers. In order to form a cyclic sulfide polymer capable of initiating vinyl-substituted monomers the linear polysulfide must contain an active carbanion end. Thus it is the carbanion which initiates the polymerization of vinyl-substituted monomers.

SUMMARY OF THE INVENTION

It is therefore an object of the present invention to provide a method for the polymerization of thietanes, cyclic sulfides having four-membered rings, wherein a linear polymer is formed terminated by a carbanion.

It is another object of the present invention to provide a method for the preparation of a triblock copolymer of the ABA type wherein the A block is a vinyl-substituted polymer and the B block is a thietane.

It is a further object of the present invention to provide a method for the polymerization of a thietane which is capable of initiating polymerization of a vinyl-substituted monomer at either or both ends to form block or triblock copolymers.

It is a still further object of the present invention to provide a method for the preparation of ABA triblock copolymers utilizing mono and difunctional organolithium catalysts.

It is yet another object of the present invention to provide a method for preparing triblock copolymers at conditions of low temperature and pressure.

It is yet another object of the present invention to prepare a triblock copolymer having elastomeric properties with excellent azone resistance and high temperature resistance.

It is a still further object of the present invention to prepare a triblock copolymer which is highly elastomeric without vulcanization, and which may be worked or processed as a thermosetting plastic.

These and other objects of the present invention and method will become apparent from the following specification and claims.

In general, it has now been found that at low temperatures of approximately —80° C. and under high vacuum, approximately $10^{-6}$ torr, an organolithium compound and a thietane, in a polar solvent, will react to form a carbanion species and ultimately a linear polymer which is then capable of initiating polymerization of vinyl-substituted monomers at either or both ends to form block or triblock copolymers.

DESCRIPTION OF THE PREFERRED EMBODIMENTS

The organolithium compounds which initiate the polymerization of thietanes may be mono or dilithium having the generic formulae RLi and LiRLi respectively where R is aliphatic, cycloaliphatic or aromatic or combinations thereof and ranges from 1 to about 20 carbon atoms. Preferred monolithium initiators are methyllithium, ethyllithium, and the isomers of propyllithium and butyllithium. The preferred dilithium initiators are the dilithium adducts of 2,4-hexadiene, 1,1-diphenylethylene, cis or trans stilbene, isoprene, 2,3-dimethylbutadiene, α-methylstyrene and the like. The preferred amount of monolithium initiator ranges from 2.0 to 0.5 millimoles/100 grams of thietane. Thus, the molecular weight of the linear polymer so produced will range between 40,000 and 1,000,000 with a desired molecular weight of approximately 50,000 to 200,000.

The thietanes which may be polymerized have the general formula:

(F₁)

where $R_1$ is selected from the group consisting of alkyl, aryl, cycloalkyl radicals and combinations thereof having from 1 to 9 carbon atoms and where $R_2$ to $R_6$ are selected from the group consisting of hydrogen and alkyl, aryl, cycloalkyl radicals and combinations thereof having from 0 to 9 carbon atoms. The total of

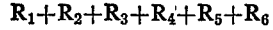

should not exceed 24 carbon atoms. As one skilled in the art will recognize, there are many thietanes available. However, according to the present method, only those thietanes which are soluble when polymerized will work. Generally, it has been found that thietanes which are nonuniform in structure will be soluble when polymerized; accordingly trimethylene sulfide has been found not to work, while in contrast 2-methyltrimethylene sulfide polymerizes under the conditions of the present method.

The preferred polymerization solvents are polar and are selected from one of three different groups. Group 1 consists of tetrahydrofuran, di-ethyl ether, tetrahydropyrane and other cyclic or linear ethers alone or in combination which are liquids at low temperatures and pressures. Group 2 consists of mixtures of ethers and alkanes which are liquids at low temperatures and pressures in the ratio of approximately 50/50 such as hexane and tetrahydrofuran or pentane and tetrahydrofuran. Group 3 consists of alkanes preferably having from 5–12 carbon atoms and 1 to 5 volume percent hexamethylphosphortriamide or the t-amines. A solvent from the latter group promotes both the initiation rate and the propagation rate.

The polymerization is initiated at about −80° C. or lower in order to assure formation of the carbanion species. While the polymerization temperature range in the reaction vessel is between −80° to 0° C., initiation at −80° C. or below, with a subsequent rise to −40° C. during polymerization is preferred. Owing to the highly reactive nature of the carbanion it is imperative that the reaction vessel be free from active hydrogens and compounds such as water. For this reason the polymerization, according to the preferred method, is carried out in a high vacuum so as to be substantially free from active hydrogens, such as on the order of $10^{-6}$ torr. Or, if preferred, an inert atmosphere such as nitrogen may be utilized in lieu of the high vacuum.

Under the aforementioned conditions the thietane represented in $F_1$, above, is attacked by the organolithium initiator RLi, at the sulfur atom resulting in a ring opening to produce a primary carbanion species having the general formula:

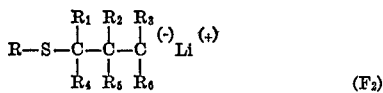
($F_2$)

Each of the carbanions thus formed will react repetitively with excess thietane to yield a linear polymer having the general formula:

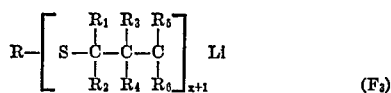
($F_3$)

wherein X is an integer of at least 160 up to approximately 12,000. It is to be understood that the molecular weight of the polythietane $F_3$ is dependent upon the ratio of catalyst to monomer selected.

If a di-lithium initiator is selected the polythietane will have two primary carbanions, one at either end. The primary carbanions, formed with either initiator, are capable of initiating vinyl-substituted styrene monomers having up to about 12 carbon atoms to form block copolymers. Representative monomers are styrene, the alkylstyrenes such as α-methylstyrene, 4-isopropylstyrene, 4-t-butylstyrene and the like. The nitriles such as acrylonitrile, ethacrylonitrile and methacrylonitrile and the like may also be polymerized.

To form a triblock copolymer of the general type ABA wherein A represents the vinyl substituted polymer and B represents the thietane polymer it is possible to first initiate the A constituent with an organolithium catalyst. When polymerization is complete the B or thietane constituent is then added and it will grow to form a block copolymer of the type AB. At this stage the thietane portion will have a terminal primary carbanion. Thus with a subsequent charge of the A, vinyl-substituted monomer, a third polymerization will take place resulting in the final ABA triblock copolymer.

Alternatively, the thietane may be initiated first with a dilithium catalyst. After polymerization thereof, a subsequent charge of the vinyl-substituted monomer will be polymerized by both carbanions of the thietane resulting in the ABA triblock copolymer.

The ABA triblock copolymer formed by either method yields a product having unexpected but excellent ozone resistance and outstanding thermal stability. It may be used where elasticity, comparable to that of rubber is required, yet quite unlike rubber, vulcanization is not necessary since the triblock copolymers although having a rubber central portion have the totally unexpected processing property of behaving as a thermoplastic. The polymer thus formed may be utilized generally in lieu of rubber compounds and specifically in extrusion molding, injection molding processes and the like to produce such items as heels, toys and bottle caps and the like and does not require curing. Degradation measurements made in air have shown that this polymer chain maintains its integrity up to at least 240° C.

It has been found desirable to form the B or central unit with a molecular weight of generally around 50,000 to 200,000 which will easily flow in molding processes. At the upper limit, i.e., about 1,000,000 molecular weight, the polymer would be difficult to mold whereas the lower limit, i.e., 40,000 molecular weight would be deleterious to the elastomeric properties. A good average molecular weight for the A or end units ranges from 10,000 to 20,000.

The following five examples recite the preparation of ABA triblock copolymers utilizing mono and dilithium initiators. All reactions were conducted at approximately −80° to −40° C. and under a vacuum on the order of $10^{-6}$ torr. Also recorded are the tensile strength and elongation ratio of the final block copolymer. Degradation of the polymer chain occurred at approximately 290° C. under a vacuum.

EXAMPLE I

Into a suitable reaction vessel was charged 3.5 grams of styrene and 0.2 millimoles of n-butyllithium in 100 mls. of tetrahydrofuran. Temperature within the reaction vessel during polymerization was maintained at −50° C. Following the polymerization of the styrene, 14 grams of α-methyltrimethylene sulfide was added and allowed to react with the polystyrene for 24 hours. Upon completion of the formation of the polystyrene-polysulfide, or AB block copolymer, a second quantity, 3.5 grams, of styrene was added to the reaction vessel and permitted to polymerize, the reaction being almost instantaneous. Subsequent examination of the ABA triblock copolymer thus formed revealed a tensile strength at break of 1500 lbs./in.² and an elongation ratio of 11.

EXAMPLE II

In a similar manner as described in Example I, but at −80° C., 2.5 grams of α-methylstyrene was initiated by 0.1 millimoles of sec-butyllithium in 70 mls. of tetrahydrofuran. Following polymerization of the α-methylstyrene, 9 grams of α-methyltrimethylene sulfide was added and polymerized and then an alditional 2.5 grams of α-methylstyrene was added and polymerized. The ABA triblock copolymer thus formed was found to have a tensile strength at break of 1400 lbs./in.² and an elongation ratio of 11.

EXAMPLE III

In this reaction the B monomer, α-methyltrimethylene sulfide, was polymerized first by charging 10 grams into the reaction vessel with 0.2 millimoles of a dilithium adduct of 2,4-hexadiene in 85 mls. of tetrahydrofuran at a temperature of −50° C. Polymerization of the B linear polymer was complete after 26 hours and 5 grams of α-methylstyrene was then added and polymerized by the polysulfide to form the ABA triblock copolymer. Subsequent tests revealed a tensile strength at break of 1400 lbs./in.² and an elongation ratio of 10.

EXAMPLE IV

In a similar manner as described in Example III, but at −80° C., 10 grams of α-methyltrimethylene sulfide was charged into the reaction vessel with 0.3 millimoles of dilithium adduct of 2,4-hexadiene in 130 mls. of tetrahydrofuran. After 24 hours the polymerization was complete and 7 grams of α-methylstyrene was added yielding an ABA triblock copolymer having a tensile strength at break of 1600 lbs./in.² and an elongtaion ratio at break of 11.

EXAMPLE V

In a similar manner as described in Examples III and IV, but at −40° C., 12 grams of α-methyltrimethylene sulfide was charged into the reaction vessel with 0.25 millimoles of α-methylstyrene dilithium in 150 mls. of tetrahydrofuran. After 24 hours the polymerization was complete and 5 grams of α-methylstyrene was added yielding an ABA triblock copolymer having a tensile strength at break of 1500 lbs./in.² and an elongation ratio at break of 9.

It can be seen that the disclosed invention carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A method for the preparation of block copolymers of thietanes and vinyl-substituted monomers comprising the steps of: reducing the pressure within a reaction vessel to approximately $10^{-6}$ torr so as to substantially eliminate any active hydrogen containing compounds, charging said vessel with a vinyl-substituted monomer, cooling and maintaining said vessel at a temperature range of at least −80° C. to about 0° C. charging a catalytic amount of monolithium organic initiator into said vessel, polymerizing the vinyl-substituted monomer, charging a thietane monomer having the formula:

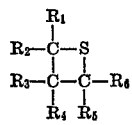

wherein $R_1$ is selected from the group consisting of alkyl, aryl, cycloalkyl radicals and combinations thereof having from 1 to 9 carbon atoms and $R_2$ to $R_6$ are selected from the group consisting of hydrogen and alkyl, aryl, cycloalkyl radicals and combinations thereof having from 0 to 9 carbon atoms, polymerizing the thietane to form a vinyl-thietane carbanion terminated linear polymer, again charging a vinyl-substituted monomer into said vessel, forming a second vinyl polymer and thereby forming the vinyl-thietane-vinyl block copolymer.

2. A method for the preparation of block copolymers as in claim 1, wherein $R_1$ is a methyl radical and $R_2$ to $R_6$ are hydrogen.

3. A method for the preparation of block copolymers as in claim 1, wherein said monolithium organic compound has the general formula RLi wherein R is selected from the class consisting of aliphatic, cycloaliphatic and aromatic radicals having from 1 to about 20 carbon atoms.

4. A method for the preparation of block copolymers as in claim 3, wherein R is selected from the class consisting of methyllithium, ethyllithium, and the isomers of propyllithium, and butyllithium.

5. A method for the preparation of block copolymers as in claim 1, wherein the preferred temperature is at least from −80° C. to about −40° C.

6. A method for the preparation of block copolymers as in claim 1, wherein the vinyl-substituted monomers are selected from the class consisting of styrene monomers and substituted styrene monomers having up to about 12 carbon atoms.

7. A method for the preparation of block copolymers as in claim 6, wherein the substituted styrene monomers are selected from the class consisting of styrene, α-methylstyrene, 4-isopropylstyrene and 4-t-butylstyrene.

8. A composition of matter comprising a block copolymer having the general configuration ABA wherein each A block is a vinyl-substituted polymer having an average molecular weight of 10,000 to 20,000 and is selected from the class consisting of styrene monomers, substituted styrene monomers having up to about 12 carbon atoms and nitrile monomers and the B block is derived from a thietane having an average molecular weight of 50,000 to 200,000 and having a repeating unit represented by the formula:

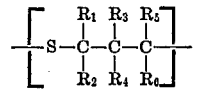

wherein $R_1$ is selected from the group consisting of alkyl, aryl, cycloalkyl radicals and combinations thereof having from 1 to 9 carbon atoms and $R_2$ to $R_6$ are selected from the group consisting of hydrogen and alkyl, aryl, cycloalkyl radicals and combinations thereof having from 0 to 9 carbon atoms, said ABA block copolymer having an average tensile strength of from about 1400 pounds per square inch to about 1600 pounds per square inch and an average elongation ratio of from about 9 to about 11.

9. A block copolymer as in claim 8 wherein the A blocks are polystyrene and the B block is polymethyltrimethylene sulfide and wherein said block copolymer has a high degree of ozone resistance and thermal stability maintaining its integrity up to about 240° C. in air.

References Cited

UNITED STATES PATENTS 3,328,361   6/1967   Edmonds, Jr. _____ 260—79

OTHER REFERENCES

Morton et al., Journal of the American Chemical Society, vol. 92, May 20, 1970, pp. 3217–3218.

Morton et al., Polymer Preprints, vol. 13, No. 1, April 1972 (pp. 61–65), Division of Polymer Chemistry, American Chemical Society.

MELVYN I. MARQUIS, Primary Examiner

U.S. Cl. X.R.

260—79, 887, 898